United States Patent
Adolph et al.

(10) Patent No.: US 6,578,049 B1
(45) Date of Patent: Jun. 10, 2003

(54) REPLAY APPLIANCE FOR RECORDING MEDIA CONTAINING INFORMATION BLOCKS

(75) Inventors: Dirk Adolph, Ronnenberg (DE); Marco Winter, Hannover (DE)

(73) Assignee: Thomson Licensing, S.A., Boulogne-Billancourt (FR)

(*) Notice: Subject to any disclaimer, the term of this patent is extended or adjusted under 35 U.S.C. 154(b) by 0 days.

(21) Appl. No.: 09/469,860

(22) Filed: Dec. 22, 1999

(30) Foreign Application Priority Data

Dec. 23, 1998 (DE) .......................... 198 59 923

(51) Int. Cl.⁷ .............................................. G06F 17/30
(52) U.S. Cl. .................... 707/104.1; 707/100; 707/200; 710/73
(58) Field of Search ............................. 710/58, 73, 61, 710/60; 707/1, 2, 3, 100, 200, 104.1, 205, 204, 203, 101; 386/95; 395/893; 348/403; 345/349; 369/13, 11, 14, 124, 275; 709/224

(56) References Cited

U.S. PATENT DOCUMENTS

| | | | |
|---|---|---|---|
| 5,687,397 A | | 11/1997 | Ohmori .......................... 710/73 |
| 5,745,112 A | * | 4/1998 | Hirose .......................... 345/349 |
| 5,799,212 A | * | 8/1998 | Ohmori ........................ 395/893 |
| 5,835,145 A | * | 11/1998 | Ouyang et al. ............. 348/403 |
| 6,160,952 A | * | 12/2000 | Mimura et al. ............... 386/95 |

FOREIGN PATENT DOCUMENTS

| | | | |
|---|---|---|---|
| EP | 0724264 A2 | 7/1996 | ........... G11B/27/32 |
| EP | 0788094 A1 | 8/1997 | ............. G11B/7/00 |
| EP | 0817195 A2 | 1/1998 | ........... G11B/27/32 |

OTHER PUBLICATIONS

German Search Report citing the above–listed references: AA.

European Search Report citing the above–listed references: AA, AM, AN, and AO.

* cited by examiner

Primary Examiner—Dov Popovici
Assistant Examiner—Hassan Mahmoudi
(74) Attorney, Agent, or Firm—Joseph S. Tripoli; Joseph J. Laks; Reitseng Lin

(57) ABSTRACT

A replay appliance for recording media containing information blocks, the appliance comprising means which are independent of the contents directory for access to files and information, and which allows replay even if the contents directory or file system is damaged. The appliance includes search means for searching for a designator of a file which is to be localized in blocks of the recording medium, evaluation means for determining the designator of following bytes which indicate a number of 2048 byte blocks from which the information block is composed, and the information block determined in this way is used for data access. The field of application of the invention extends to replay appliances for recording media containing information blocks, such as a hard disk, a digital versatile disk, which is also referred to as a DVD, a CD-ROM, floppy disk or a data tape, which have a recording format from the so-called Yellow Book.

6 Claims, 5 Drawing Sheets

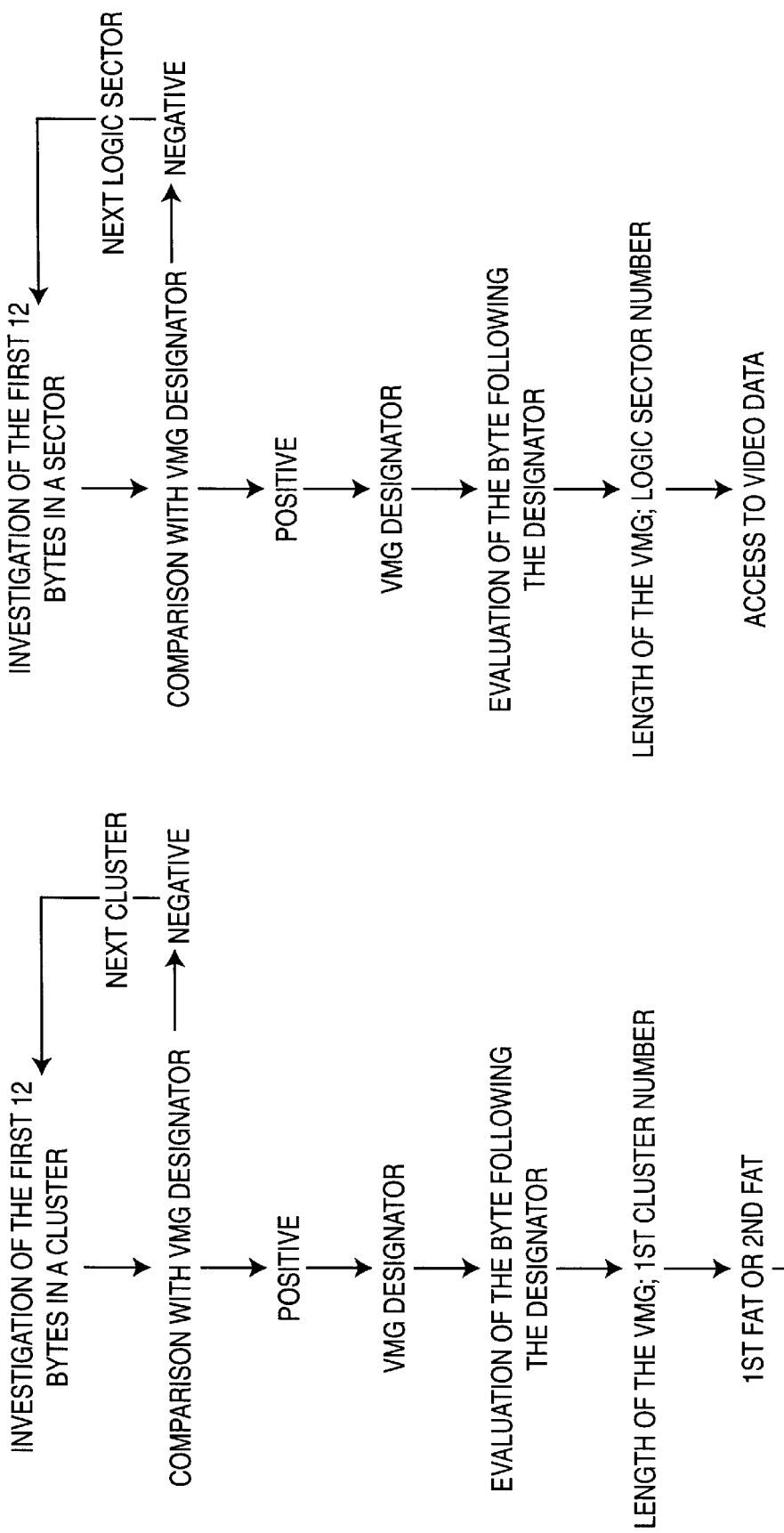

REPLAY APPLIANCE FOR RECORDING MEDIA CONTAINING INFORMATION BLOCKS

FIELD OF THE INVENTION

The invention relates to a replay appliance for recording media containing information blocks, having means which are independent of the contents directory for access to files and information, such as video information on a hard disk, a digital versatile disk, which is also called a DVD, a CD-ROM, a floppy disk or a data tape, which have a recording format from the so-called Yellow Book.

BACKGROUND OF THE INVENTION

The CD, which was originally developed as a digital recording medium for audio sequences, already has numerous successors for recording and/or replaying information stored in information blocks. However, additional items were required to allow the CD to be used as a data medium.

While, in the case of the audio CD, the data were stored in tracks and a time code was sufficient to locate the individual sectors, the sectors were given additional headers, a further error correction level and a file system for administration of the data on the disk. Much of the information, which was accommodated in the sub-channels on the conventional CD, was moved into the header. Thus, in principle, with the DVD, a change was made from addressing via sub-channels, and the size of the sectors for all types of data was limited to 2048 bytes. For data security reasons, the data on CD-ROM and DVD are not arranged physically following one another sequentially, but are distributed over the disk in data packets using a specific algorithm, which is even more complex for the DVD than for the CD-ROM. The data in each sector are arranged in rows, are interleaved and are stored on the DVD in relatively small packets, the so-called recording sectors, which are split into two blocks by means of a synchronization code. With a DVD video, this is also supplemented by copy protection and prior data reduction. Since the information is stored in so-called information blocks on the recording media, replaying by means of absolute relative time coding, in an analogous manner to a CD, is fundamentally impossible.

In principle, the information level (which is called a layer) is, however, split in a similar way to a CD into a lead-in, a program area and a lead-out. The contents directory in the case of a DVD, which has no sub-channel, is accommodated in sectors and is referred to as the so-called file system by means of which files are located on the recording medium. The file systems for applications such as the hard disk of a computer, the CD-ROM organized in accordance with ISO 9660 Standard and the DVD designed in accordance with the UDF Format have further differences.

SUMMARY OF THE INVENTION

The object of the invention is to provide a replay appliance for recording media containing information blocks, having means which are independent of the contents directory for access to files and information, for example if the contents directory or file system is damaged, even though the contents directory is not available in a sub-channel which can be reconstructed in a simple way, and differs depending on the application.

This object is achieved by means, which are specified in independent claims, and advantageous refinements and developments are specified in dependent claims.

One aspect of the invention is to allow access to important files and information despite a content directory for the file system being damaged and despite the use of different file systems.

According to the invention, a search is for this purpose carried out in blocks of the recording medium, using a characteristic feature of the file to be located. It has been found that recording media having information blocks have so-called designators, which, despite the content directory not being legible and the use of different file systems, are suitable in an advantageous manner to locate files, which need to be replayed. Even if the physical location of the designator is initially unknown owing to a defective or damaged contents directory, it is initially identified on the basis of its length, which, for example in the case of a DVD video, is generally 12 bytes, and on the basis of its position at the start of a sector or cluster. If such a designator is found, it is generally (in systems known to date) the video manager designator itself or its backup, which is designated in an identical manner as the DVDVIDEO-VMG in the case of a DVD. In order to be completely certain that this is the desired designator, further plausibility checks can be carried out, for example a check to determine whether the video manager is followed by a video title set, or a check using the end address of the video manager, which is contained in the video manager. The four bytes that follow the video manager designator describe the end address of the video manager. The value of the end address of the video manager plus one is equal to the number of 2048 byte blocks from which the video manager is composed. The length of the video manager and the first cluster number of the video manager are thus known. The cluster number is obtained from the position at which the first video manager designator is located. This position is found directly from the comparison (which is used as a search means) with the video manager designator, or as the result of the plausibility check from the backup of the video manager designator that has been found.

If the video manager were to be fragmented, the position of the video manager is then completely reconstructed using the first cluster number of the video manager and the first or second file allocation table. The term file allocation table in this case represents a pointer, which points to the number of the block, which contains the associated information. The first and second file allocation tables are identical, so that the redundancy provided in this way ensures adequate confidence for finding fragmented information blocks.

In the case of a DVD-ROM or a DVD movie which, as a rule, are not fragmented, the circuitous route via a file allocation table is superfluous, since the position of the video manager is already completely known immediately once the first memory block of the video manager has been found.

Once the contents directory which is contained in the video manager has been reconstructed in this way, the recording medium can then be played back completely, even if the file system or contents directory is damaged.

The information corresponding to the contents directory of the recording medium is reconstructed in an advantageous manner, making it possible to replay information media which have faults relating to the contents directory, which is otherwise absolutely essential for replaying. With a replay appliance designed in such a way, it is then possible not only to replay recording media having different file systems, but also to replay recording media having a damaged content directory.

BRIEF DESCRIPTION OF THE DRAWINGS

The invention will be explained in more detail in the following text with reference to drawings, in which:

FIG. 5: shows a flowchart of the reconstruction of the content directory on a hard disk, FIG. 6: shows a flow chart of the reconstruction of the contents directory of a DVD.

DETAILED DESCRIPTION OF THE PREFERRED EMBODIMENTS

Figure 1:
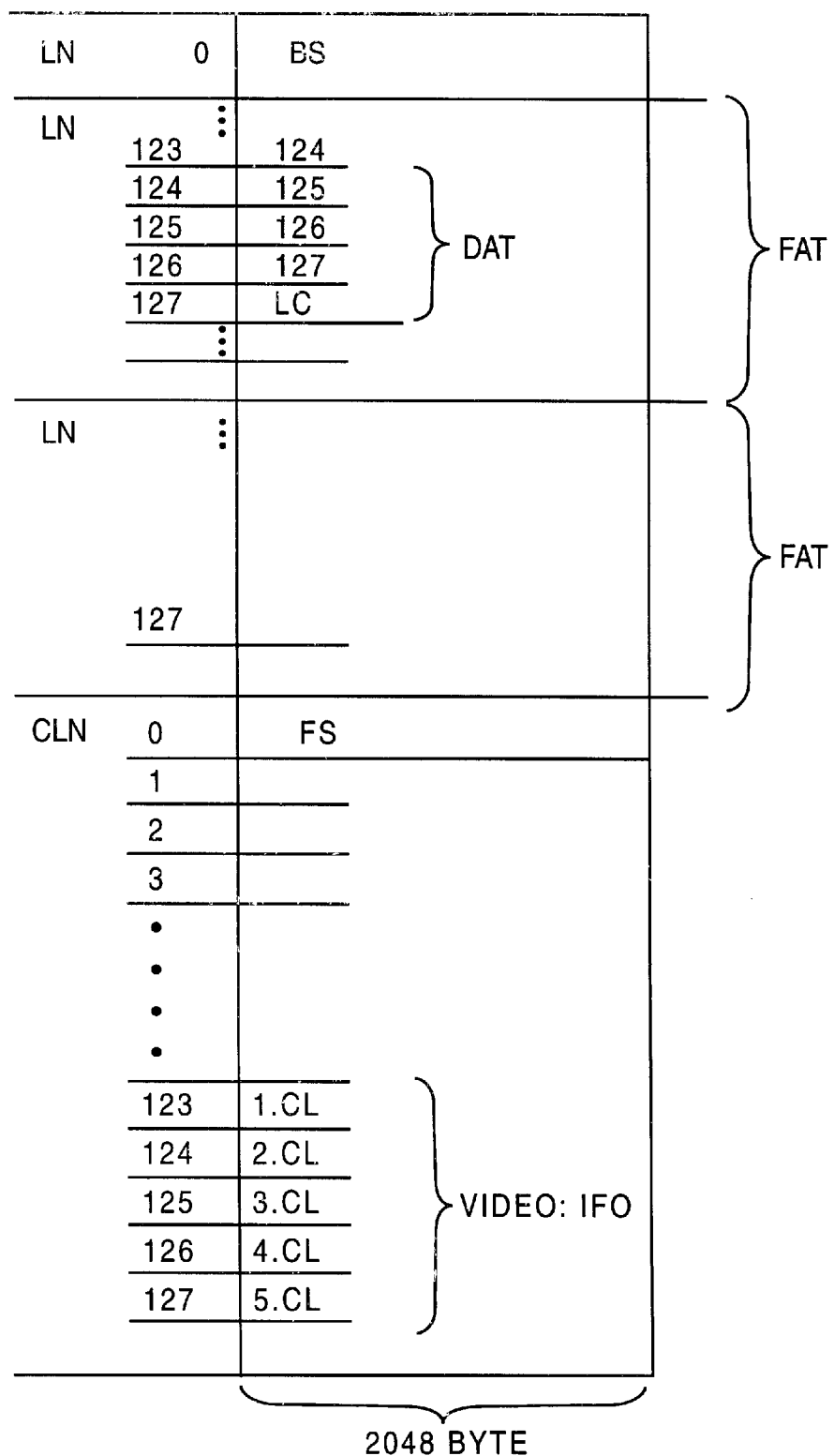
FIG. 1: shows an outline sketch of the data structure on a hard disk
Figure 3:
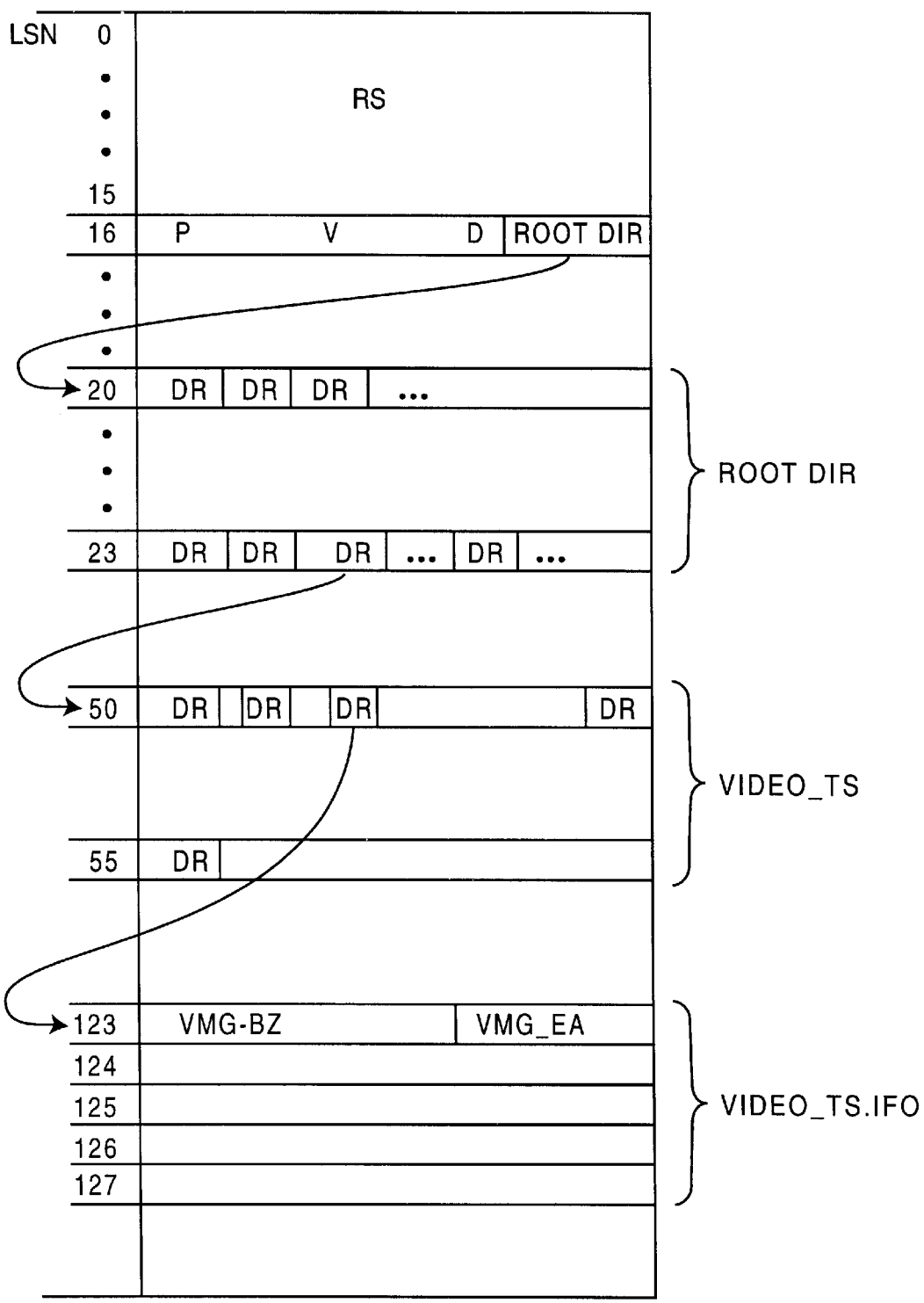
FIG. 3: shows an outline sketch of the data structure in accordance with the ISO 9660 Standard.
Figure 4:
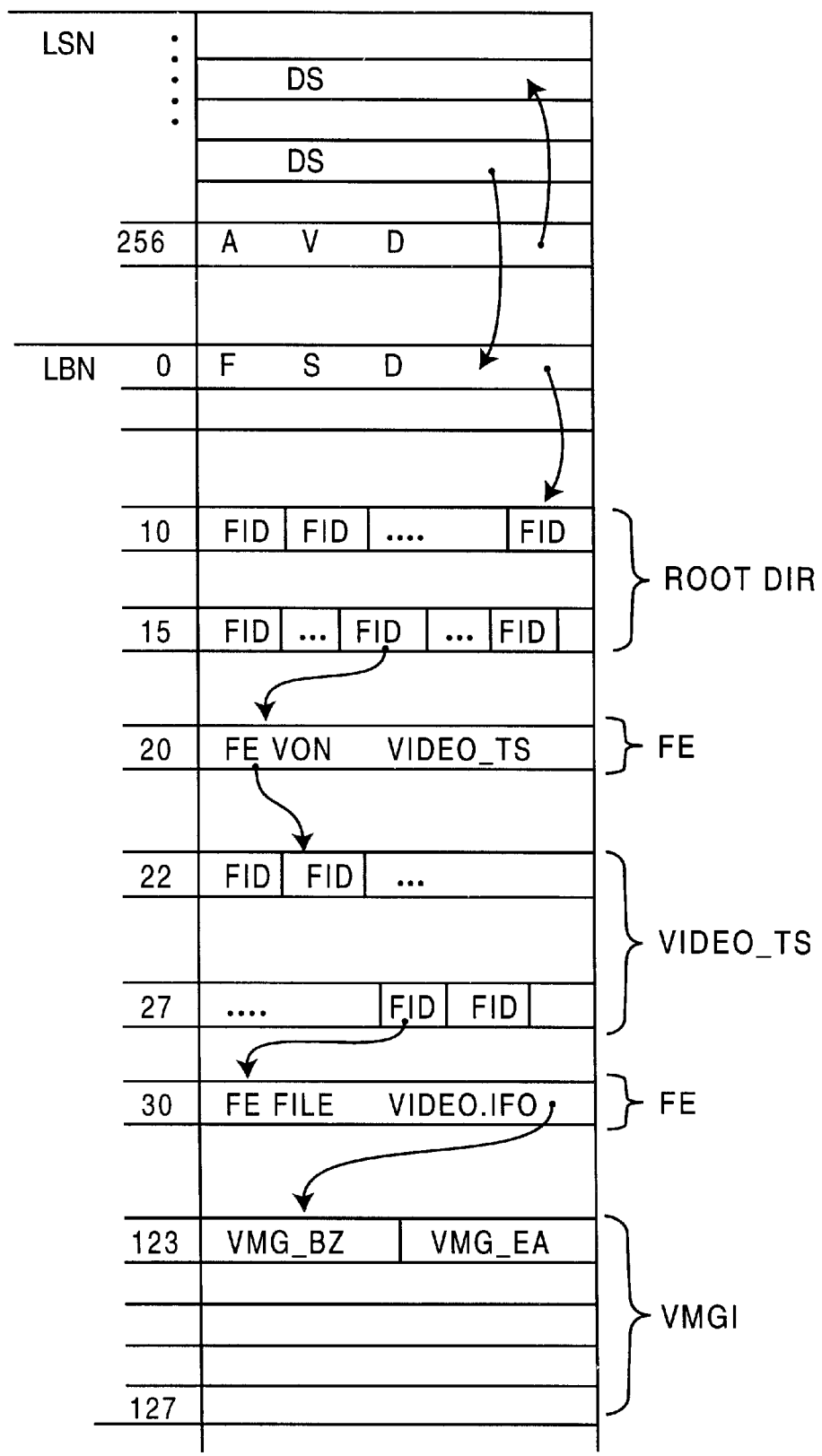
FIG. 4: shows an outline sketch of the data structure in accordance with the UDF format.

As is shown in FIGS. 1, 3 and 4, the recording media containing information blocks have a fundamentally different file system depending on whether they are configured as a hard disk in a computer, as a CD-ROM or as a DVD, this file system being intended for access to a specific file. Although their structures are also different, one common feature is a content directory, which is provided for playing back the information media. Since, owing to the splitting and interleaving of the information stored in the information blocks, the time code which is appropriate for CD audio cannot be used to locate the information, it must initially be assumed that it is impossible to replay a recording medium having information blocks, if the contents directory is missing or damaged. This is because, as a rule and in contrast to a CD, the content directory exists in only one complete version, distributed over information blocks and, furthermore, the routes that lead to the desired file differ depending on the type of recording medium. For example, FIG. 1 shows the data structure of an MS-DOS partition on the hard disk of a computer for this purpose. This comprises a so-called boot sector BS; a first so-called file allocation table FAT and a second file allocation table FAT, as well as a so-called file space FS, which is split into so-called clusters CL. The boot sector BS has a number zero corresponding to the list number LN, and the allocation tables FAT contain a list of all the clusters CL in the file space FS. A cluster CL in turn comprises a number of sectors, and a so-called file comprises an integer number of clusters CL. Each entry in the file allocation table FAT contains the number of the following cluster CL or the so-called cluster number CLN, and a last cluster LC mark is provided, which indicates that the file ends there. Further special values, which will not be described in any more detail here, indicate that a cluster CL is free or is damaged and cannot be used. The first file allocation table FAT and the second file allocation table FAT are identical, and also have the corresponding list numbers LN.

A file location DAT is then, corresponding to FIG. 1, indicated, by way of example, by the list numbers LN 123 to 127, with he entry LC for the list numbers LN 127 indicating the end of the file. This means that a file with a length of five clusters CL is located in the file space FS starting from the cluster number CLN 123.

The file space FS, which is split into clusters CL, contains the files and so-called directories, a directory in turn comprising entries which contain the name of the file, the file length, the file attributes such as read-only, and the number of the first cluster CL in the file allocation table FAT.

Using FIG. 1 as an example, let us assume that the name of the file is video information VIDEO.IFO and, since it has five clusters CL, the file is then 10240 bytes long, a file attribute read-only identifies the read-only status, and the first cluster CL in the file has the cluster number CLN 123.

Figure 2:
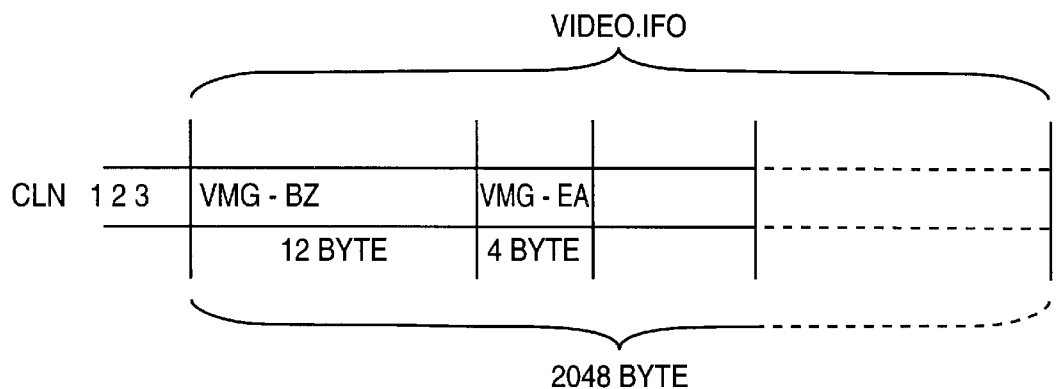
FIG. 2: shows an outline sketch of the structure of the first cluster of a file on a hard disk.

FIG. 2 shows the form of a cluster CL having the cluster number CLN 123, by way of example. The first 12 bytes in the first cluster CL in the file with the name video information VIDEO.IFO contain a video manager designator VMG-BZ and the following 4 bytes indicate the end address of the video manager VMG_EA. According to the invention, a search means is provided for finding a designator, which, in this case, is the video manager designator VMG-BZ in order to access a file which is to be located, which in this case is the file with the name video information VIDEO.IFO, or in order to find this file despite the contents directory having been destroyed. In this case, the blocks are blocks in the file space FS or the clusters CL in the file space FS which are searched through by a mask that is used as the search means. On the basis of this configuration, the search means is a comparison of the first 12 bytes in each cluster CL with the video manager designator VMG-BZ. A window with a width corresponding to 12 bytes is preferably used whose contents are compared with the video manager designator VMG-BZ. If a video manager designator VMG-BZ is found, the 4 bytes following the video manager designator VMG-BZ are evaluated. An evaluation means for determining the byte following the designator is provided for this purpose. The bytes following the video manager designator VMG-BZ indicate the end address of the video manager VMG_EA. This end address of the video manager VMG_EA then identifies a number of the 2048 byte blocks from which the information block is composed. For this purpose, one is added to the end address of the video manager VMG_EA. The position and the length of the video manager, which is required to replay the file with the name video information VIDEO.IFO, are thus uniquely determined, since the first cluster number CLN is already known from the search result but the investigated point is a video manager designator VMG-BZ. The method on which the invention is based is shown in FIG. 5 as a flow chart. As already explained, the first 12 bytes of the clusters CL are compared with the video manager designator VMG-BZ in a first method step until a match is found. If the comparison result is positive, the cluster numbers CLN of the first cluster CL of the file to be found is then also known. The length of the video manager is then determined by evaluating the bytes following the designator so that, in consequence, all the information, which corresponds to a content directory, is reconstructed. According to FIG. 5, an additional method step is provided, which, however, need be provided only if it is necessary to assume that the recording medium is fragmented. In such a case, the position of the video manager is completely reconstructed using the first cluster numbers CLN of the video manager and the first or second file allocation tables FAT. Pointers are provided in the file allocation tables FAT which then point to the corresponding number of the block or to the corresponding cluster number CLN at which the following information block is located. Since the first and the second file allocation tables FAT are identical, this also ensures sufficient confidence for finding fragmented files.

A recording medium which complies with the ISO 9660 Standard and whose data structure is shown in FIG. 3 has logic sector numbers LSN. The logic sector numbers LSN from zero to 16 are reserved, and a primary volume descriptor PVD is located at the logic sector number LSN equal to 16, and likewise has a pointer RootDir to the pointer RootDir subsequently formed by directory entries DR. In this way, corresponding to the pointer RootDir in the primary volume descriptor PVD, FIG. 3 refers, by way of example, to the logic sector number LSN equal to 20, and a reference to a logic sector number LSN is provided in the title area Video_TS in the pointer RootDir formed by directory entries DR, starting from the logic sector number LSN equal to 50. Finally, a directory entry DR in the title area Video_TS refers to a file which (in order to remain with the example shown in FIG. 1) is intended to have the logic sector number LSN equal to 123 by way of example, instead of a comparatively different start. However, in this case, the file corresponds to video title information VIDEO_TS.IFO.

Although the routes to reach the file are fundamentally different, the file can likewise be found on a recording medium in accordance with the ISO 9660 Standard using the method described above in an appropriate appliance. Since, as already been found, video title information VIDEO_TS.IFO also comprises information blocks whose first information block in this file contains a video manager designator VMG-BZ, this characteristic feature is used to find the file, and the length of the video manager as well as a logic sector number LSN at which the file starts are determined in an analogous manner to the cluster number CLN. The method, which is illustrated using a flowchart in FIG. 6, in this case does not differ from that which has to be provided for recording media with information recorded in accordance with the UDF format.

As is shown in FIG. 4, the data structure in accordance with the UDF format likewise has logic sector numbers LSN and, furthermore, has logic block numbers LBN. The logic block numbers LBN start from a logic sector number LSN, which results from the logic sector numbers LSN, required for the initial area. In consequence, a corresponding logic sector number LSN can also be quoted in the region of the logic block numbers LBN and is calculated in this region using the equation LSN=LBN+X, where X is the logic sector number LSN at which the partition or the so-called file set descriptor FSD starts. Various descriptors DS are provided in the initial area of the UDF data structure, which refer to the file set descriptor FSD and to which the anchor volume descriptor AVD refers. The anchor volume descriptor AVD is provided at the logic sector number LSN which is equal to 256 and is permanently pre-set, and, in consequence, is generally available at this logic sector number LSN. The file set descriptor FSD leads to file identifier descriptors FID which are provided in a pointer RootDir and which, for their part, refer to a so-called file entry FE which follows the pointer RootDir. File entries FE which follow the pointer RootDir lead to file identifier descriptors FID which are provided in a title area Video_TS and which, for their part, refer to file entries FE which follow the title area Video_TS. In principle, file identifier descriptors FID contain a designator, the file length, (optional) attributes and the logic sector numbers LSN of the file. A file entry FE contains the first logic sector number LSN of the fragments into which the file is split. Since no fragmentation is allowed with a DVD video a file entry FE on a DVD video contains only an entry relating to the file length and block number.

Finally, file entries FE following the title area Video_TS refer to a video management information VGMI file, whose first information block contains a video manager designator VMG-BZ.

In the case of the UDF format as well, the video manager VMG-BZ is followed by 4 bytes which indicate the end address of the video manager VMG_EA, so that the proposed method can also be used for recording media with information recorded in accordance with the UDF format, and a replay appliance can be provided by means of which files on recording media containing information blocks and in different file formats can be found and replayed, even if the contents directory of the recording medium is defective.

The structure of the method, which is shown as a flowchart in FIG. 6, is essentially identical to the sequence shown in FIG. 5. The only difference is that, corresponding to the type of recording medium logic sectors are searched for the video manager designator VMG-BZ. The problem that a file, video management information VGMI, corresponding to FIG. 7, in the video manager is also provided as a back up and thus, when finding the video manager designator VMG-BZ by means of the window used as a search means, means that it is not possible to be absolutely certain whether the video manager designator VMG-BZ or the backup of the video manager designator VMG-BZ has been found, is preferably solved by means of a plausibility check. The said problem arises since the end address of the video manager VMG_EA, which is determined using the 4 bytes following the video manager designator VMG-BZ, is only a relative address.

Two types of plausibility check are quoted by way of example in the following text.

According to a first version, an attempt is made to determine whether, apart from a number of ECC blocks for filling and producing an integer block format, the video manager is followed immediately by a so-called video title set. The abbreviation ECC stands for Error Correction Code. If this is the case, then the video manager designator VMG-BZ that has been found is identified as the backup of the video manager designator VMG-BZ.

A second type of plausibility check consists of assessing a video manager information item VGMI greater than zero and a video manager greater than a video manager information item VGMI as information about the area of the video manager, and the first sector of the video manager referring to a video manager information table which, in addition to the video manager designator VMG-BZ, contains both the end address of the video manager VMG_EA as well the end address of the video manager information VGMI. The start of the backup of the video manager information VGMI is then determined by subtracting the end address of the video manager information VGMI from the end address of the video manager VMG_EA. This ensures a unique association as to whether the logic sector number LSN for which a video manager designator VMG-BZ has been found using the search means is the video manager designator VMG-BZ or the backup of the video manager designator VMG-BZ.

The unique identification or location of the video manager VMG-BZ thus advantageously allows access to video data irrespective of the data format in which the information on the recording medium has been recorded, as well as independently of whether the contents directory of the recording medium is or is not available.

Figure 7:
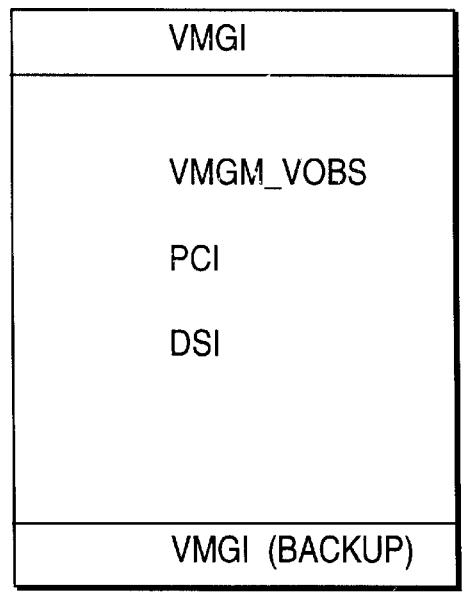
FIG. 7: shows an outline sketch of the design of a video manager.

For reasons of completeness, it should be mentioned that, apart from the video manager information VGMI, the video manager shown in FIG. 7 contains a video object set for a video manager menu VMGM_VOBS, a display control information PCI and data search information DSI.

What is claimed is:

1. A replay appliance for recording media containing information blocks comprising:

search means for comparing the first 12 bytes of each sector with a video manager designator and a window in order to evaluate the 4 bytes following the video manager designator for searching for a designator of a file which is to be localized on the basis of its length in blocks of bytes of the recording medium; and evaluation means for determining bytes following said designator, which bytes indicate a position in a number of 2048 byte blocks from which an information block is composed, for a data access independent from a contents directory for said information block.

2. A replay appliance for recording media containing information blocks comprising:

search means for searching for a designator of a file which is to be localized on the basis of its length in blocks of bytes of the recording medium; and evaluation means for determining bytes following said designator which bytes indicate a position in a number of 2048 byte blocks from which an information block is composed and wherein the evaluation means for determining the designator of following bytes evaluates 4 bytes that follow the designator to ensure that really the first sector of the information block or the end of the desired designator has been found, for a data access independent from a contents directory for said information block.

3. Replay appliance according to claim 2, wherein the 4 bytes immediately follow the designator and indicate a number of 2048 byte blocks from which the information block is composed to ensure that really the first sector of the information block or the end of the desired designator has been found.

4. A replay appliance for recording media containing information blocks comprising:

search means for searching for a designator of a file which is to be localized on the basis of its length in blocks of bytes of the recording medium; and evaluation means for determining bytes following said designator which bytes indicate a position in a number of 2048 byte blocks from which an information block is composed and wherein the search means subjects the designator to a plausibility check in order to distinguish the designator from a designator backup, for a data access independent from a contents directory for said information block.

5. Replay appliance according to claim 4, wherein the search means performs the plausibility check by determining whether, apart from Error Correction Code blocks, a video title set follows the designator.

6. Replay appliance according to claim 4, wherein for plausibility checking, the search means subtracts an end address of a video manager information from an end address of a video manager.

\* \* \* \* \*